B. MARKER.
INDICATING AND RECORDING DEVICE.
APPLICATION FILED MAR. 19, 1912.

1,062,345.

Patented May 20, 1913.

WITNESSES:
Agnes C. Caskey
Frank C. Osborne

INVENTOR.
Burton Marker
BY
William J. Jackson
ATTORNEY.

UNITED STATES PATENT OFFICE.

BURTON MARKER, OF CHESTER, PENNSYLVANIA.

INDICATING AND RECORDING DEVICE.

1,062,345. Specification of Letters Patent. Patented May 20, 1913.

Application filed March 19, 1912. Serial No. 684,896.

*To all whom it may concern:*

Be it known that I, BURTON MARKER, a citizen of the United States, residing at Chester, in the county of Delaware and State of Pennsylvania, have invented a certain new and useful Indicating and Recording Device, of which the following is a specification.

This invention broadly stated relates to indicating and recording devices and has more particular relation to that class of indicating devices, adapted for attachment to automobiles, motor-boats, aeroplanes and the like.

The principal object of the present invention may be said to reside in the providing of an indicating and recording device calculated not only to denote the number of miles traveled, but in addition thereto, to indicate in the form of a permanent record, the speed maintained per hour or fraction thereof, including a record of the time of day such record was made.

A further object of the present invention may be said to reside in the providing of an indicating and recording device, whereby permanent records in the form of filing charts may be utilized to form a history of the movements, during a given period, of the vehicle or apparatus to which said device may be attached.

A still further object of the present invention is to provide a neat, simple, accurate, efficient and comparatively inexpensive instrument of the type above recited for use in connection with automobiles, motor-boats, aeroplanes and the like.

The invention consists of the improvements hereinafter described and finally claimed.

Figure 1:
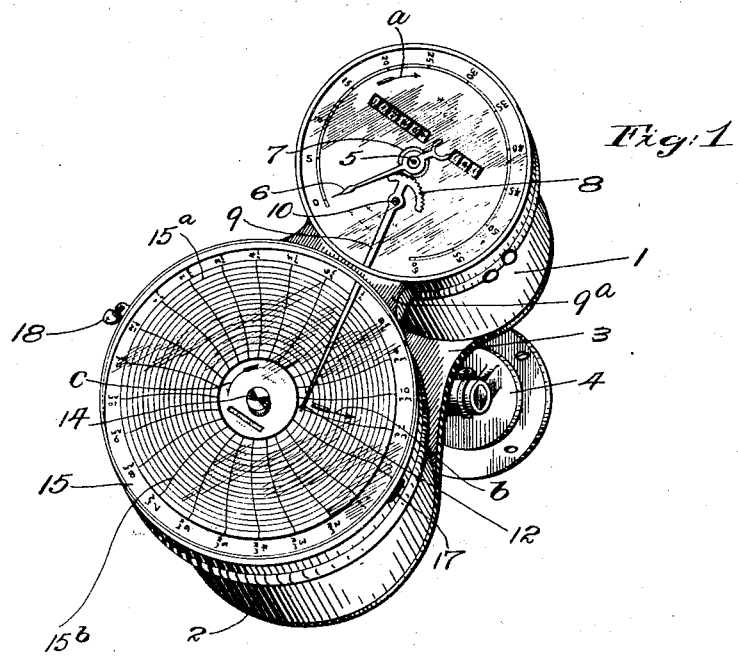
Figure 2:
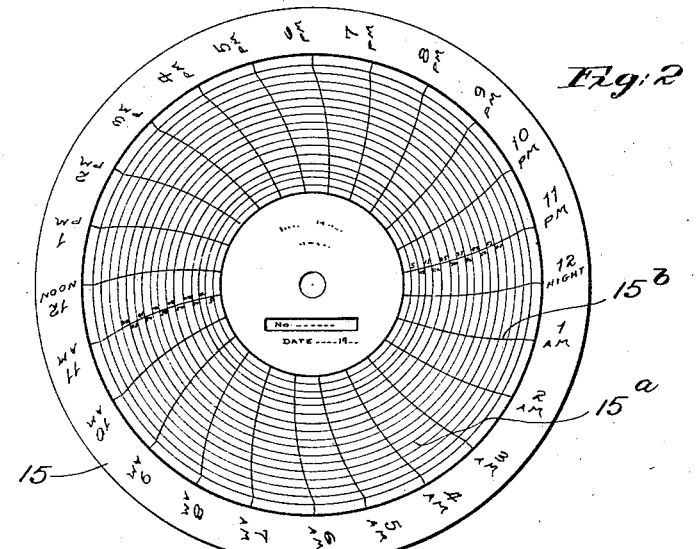
Figure 3:
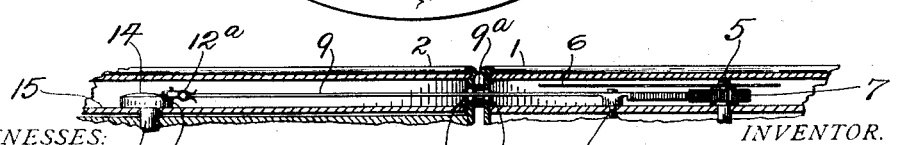

The nature, characteristic features and scope of the invention will be more fully understood from the following description, taken in connection with the accompanying drawings forming part hereof and in which:

Figure 1, discloses in perspective an indicating and recording device embodying the invention, Fig. 2, is an enlarged view of the recording chart, and Fig. 3, is a view of the pointer and detachable pencil.

As shown in the drawings, the indicating and recording device, generally speaking, is shown to comprise a speedometer 1, and a time and speed recording device 2. The parts 1, and 2, are supported by and rigidly secured to a plate 3, which plate in turn is supported by a suitable bracket 4, by which the instrument as a whole may be attached to an automobile, motor-boat, aeroplane or the like. The speedometer 1, may be of any ordinary and well-understood construction, with this exception, that the stud 5, of the operating mechanism, which carries the pointer 6, has fixed thereto, so as to be rotatable therewith, a toothed wheel 7, which is adapted to mesh with the toothed rack 8, of the pointer 9, which has pivotal relation as at 10, with the face of the speedometer 1.

It will, of course, be understood that the teeth of the above described parts are so arranged that the movement of the pointer 9, is timed to properly record upon the chart 15, hereinafter referred to, in accordance with well understood scientific precision. The working end of the pointer 9, is equipped with a recording point or pencil 12. This pencil 12, may be detachably secured by means of a spring clip 12$^a$, see Fig. 3. In practice, the pointer 9, is adapted to work through the slots 11, in the rims of the devices 1, and 2, a flat portion 9$^a$, being present through which the pointer 9, works to prevent tampering with the said pointer. Thus, the pointer 9, may be accommodated beneath the glass faces of the said devices 1, and 2. The time and speed recording device 2, as shown is somewhat larger in diameter than the speedometer 1, and is internally provided with an ordinary clock movement, not shown. The stud 13, of the clock movement is adapted to receive and have locked thereto as by means of a thumb screw 14, a circular chart 15, having delineated thereon concentric circles 15$^a$, denoting mileage.

As shown and for the sake of illustration the pointer 6, of the speedometer 1, is calculated to register up to sixty miles before being reset. The chart 15, likewise is marked for an equivalent distance. Circumferentially considered, the chart 15, has delineated thereon a period denoting 24 hours, to wit: from 1 a. m. to 12 o'clock midnight. Arranged radially of the chart 15, and connecting with each of the hour periods are curved lines 15$^b$, which cross the lines 15$^a$, and calculate mileage. Hinged as at 16, to the device 2, is a cover 17, capable of being locked to place by a padlock or other suitable securing medium 18.

The operation of the above instrument may be described as follows: For the sake of illustration, it will be assumed that the pointer 6, of the speedometer 1, registers zero. In this position, the pointer 9, also registers zero on the chart 15, of the time and speed recording device 2. As the indicator 6, commences its travel around its complemental dial in the direction of the arrow $a$, the pointer 9, commences travel in a reverse direction that is in the direction of the arrow $b$, the dial 15, moving in the direction of the arrow $c$. If the vehicle or other apparatus to which the instrument is attached maintains a moderate speed, the record made upon the chart 15, will be relatively concentric with the concentric lines upon the chart. However, should great speed be maintained then, the indication upon the chart 15, will be a line relatively parallel with one of the curved mileage lines. By means of this instrument, it may be readily determined at what time, for instance, an automobile left a garage, how long the vehicle was in operation and the speed maintained during a given period. As the chart 15, and pointer 9, are securely locked within the instrument, they cannot be tampered with by unauthorized persons nor can the working parts of the instrument be tampered with.

Among the advantages which may be claimed for the above described instrument, mention may be made of the following: A continuous record may be kept upon a series of charts of just what the vehicle or other apparatus used has accomplished in work for a long period of time; an indication and record may be kept of whether or not speed laws governing vehicles has been exceeded; indications and records may be kept as to whether or not a vehicle or other apparatus has been used without the consent of the owner; indications and records particularly for business houses may be kept of the efficiency of delivery service in the matter of movement of trucks and other conveyances during the day; and on account of the simplicity, accuracy and efficiency of such an instrument commercial value is provided.

What I claim is:

In a device of the class described the combination of a pair of cylindrical casings of different diameters, of which the smaller casing contains speedometer mechanism and of which the larger casing contains a clock movement which clock movement rotatably supports a record disk, plates arranged in parallelism connecting the tops and bottoms respectively of said casings the upper plate having an opening extended therethrough to form communication between said casings, a partially rotatable stud for the speedometer said stud carrying a speed indicating pointer, a toothed wheel fixed to said stud and a recording pointer for coöperating with said disk pivoted to a fixed part of the speedometer and having its recording part extended through said opening said pointer having formed integral therewith a toothed segment for meshing with the aforesaid toothed wheel and by which toothed wheel, said pointer is positively and solely operated.

In testimony whereof, I have hereunto signed my name.

BURTON MARKER.

Witnesses:
AGNES E. CASKEY,
WILLIAM J. JACKSON.